INVENTOR.
THORE M. ELFVING
BY
Flehr and Swain
ATTORNEYS

INVENTOR.
THORE M. ELFVING
BY
Flehr and Swain
ATTORNEYS

Oct. 5, 1965 T. M. ELFVING 3,209,547

THERMOELECTRIC REFRIGERATOR AND METHOD AND HEAT DISSIPATING SURFACE

Filed Aug. 21, 1961 4 Sheets-Sheet 3

INVENTOR.
THORE M. ELFVING
BY
Flehr and Swain.
ATTORNEYS

Oct. 5, 1965 T. M. ELFVING 3,209,547
THERMOELECTRIC REFRIGERATOR AND METHOD
AND HEAT DISSIPATING SURFACE
Filed Aug. 21, 1961 4 Sheets-Sheet 4

INVENTOR.
THORE M ELFVING
BY
Flehr and Swain
ATTORNEYS

United States Patent Office 3,209,547
Patented Oct. 5, 1965

3,209,547

THERMOELECTRIC REFRIGERATOR AND METHOD AND HEAT DISSIPATING SURFACE

Thore M. Elfving, 433 Fairfax Ave., San Mateo, Calif.

Filed Aug. 21, 1961, Ser. No. 132,919
9 Claims. (Cl. 62—3)

The present invention relates to a thermoelectric refrigerator and method and to a heat dissipating surface suitable for use therein.

In my copending application Serial No. 95,599, filed March 14, 1961, there is described a thermoelectric refrigerator which includes thermoelectric heat pumps for maintaining a commodity space above freezing temperature and a freezer space below freezing. The commodity space is formed of a double walled lining partly filled with a volatile liquid. A heat pump is connected to the upper surface of the double walled lining and serves to remove and convey heat to a heat dissipating member associated with the hot junctions of the thermoelectric heat pump. Another thermoelectric heat pump is associated with another portion of the double walled commodity lining and serves to remove heat from a freezer space and dissipate the heat to the commodity lining.

The double walled lining is in the form of spaced plates which are bonded at a multitude of spaced points. The bonds may be in the form of round patches, spots or joined surfaces of any configuration. The bonded plates form a pressure resistant panel which has a multitude of interconnected cavities or spaces substantially evenly dispersed.

In my copending application Serial No. 87,360, filed February 6, 1961, there is shown a thermoelectric heat pump assembly which includes an improved mounting for thermocouple assemblies. In general, the improved mounting comprises a grooved anodized aluminum plate adapted to be placed in thermal contact with the junction plates of the thermocouple assembly. The grooved plate forms a plurality of individual contact surfaces with each of the contacting surfaces having an area not greater than the surface area of the cooperating junction plates and spaced so that each junction plate is contacted by at least one contacting surface.

It is a general object of the present invention to provide an improved thermoelectric refrigerator.

It is another object of the present invention to provide a thermoelectric refrigerator which employs double walled lining for the heat dissipating surface.

It is a further object of the present invention to provide an improved heat dissipating surface suitable for use with thermoelectric heat pumps and for other heat dissipating purposes.

It is a further object of the present invention to provide a heat dissipating assembly which comprises a double walled heat dissipating lining including means for circulating air adjacent the lining to increase the heat transfer coefficient.

It is a further object of the present invention to provide a thermoelectric heat pump assembly which includes first and second double walled linings of the type described above in pressure contact with the junction plates of a thermoelectric heat assembly.

It is a further object of the present invention to provide a thermoelectric heat pump assembly in which first and second double walled linings are in pressure contact with the hot and cold junction plates of a thermocouple assembly and in which the double walled lining includes raised surfaces which are in contact with a substantial portion of the thermoelectric heat pump plates.

It is a further object of the present invention to provide a thermoelectric heat pump assembly in which a thermoelectric heat pump is sandwiched under pressure between first and second double walled linings.

It is a further object of the present invention to provide a thermoelectric heat pump assembly in which double walled anodized aluminum linings partly filled with a volatile liquid are placed in thermal contact with opposite surfaces of a heat pump assembly and maintained in pressure contact therewith.

These and other objects of the invention will become more clearly apparent from the following description when taken in conjunction with the accompanying drawing.

Referring to the figures.

Figure 1:
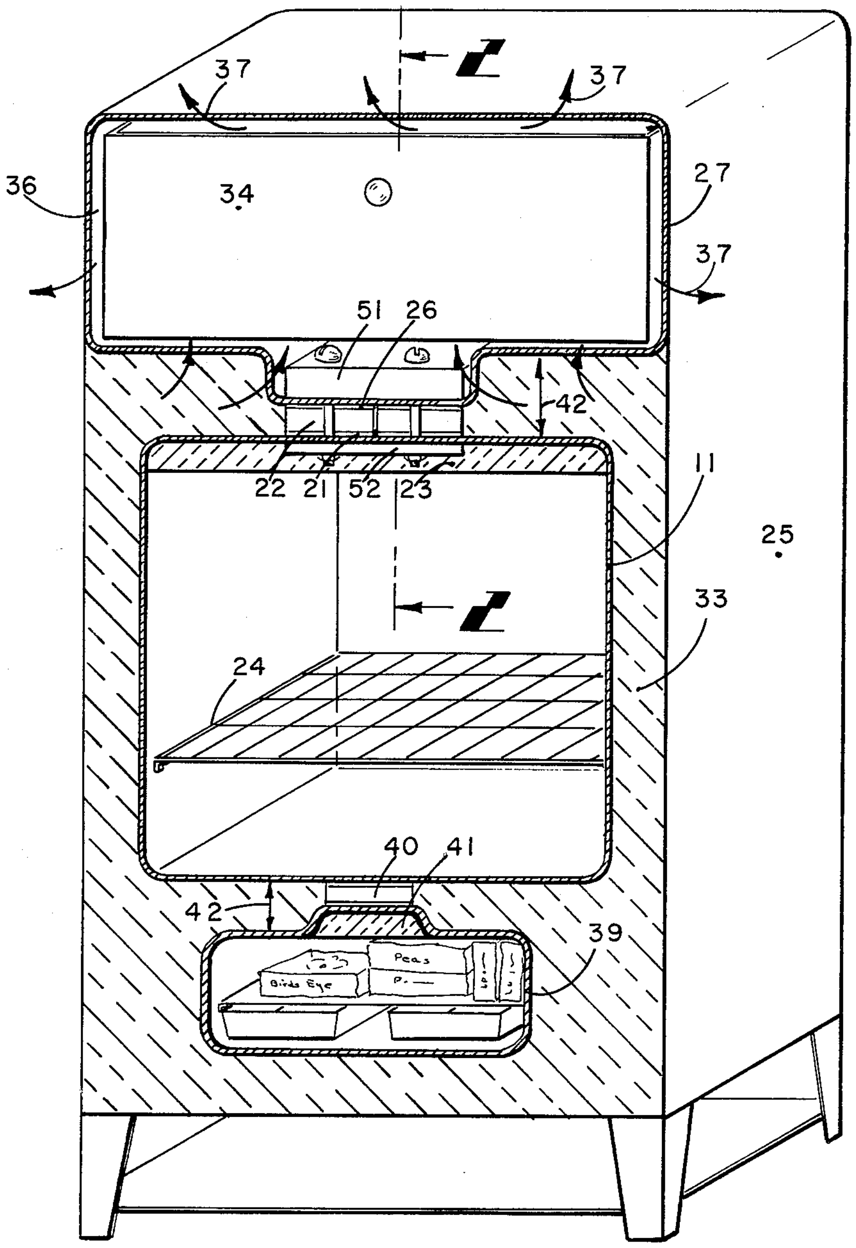
FIGURE 1 is a perspective view, partly in section, of a refrigerator in accordance with the present invention.

Referring to FIGURE 1, there is shown a perspective view, in section, of a combined thermoelectric refrigerator, freezer and warmer. The refrigerated space is defined by a double walled lining 11, to be presently described in detail. The double walled lining may be of the configuration shown in FIGURES 2 and 3 and include first and second spaced plates 12 and 13 which are bonded over predetermined areas 14 to form a plurality of passages, spaces or cavities 16 spaced throughout the lining and communicating with one another. The space between the double walled lining is filled with a volatile liquid which serves as the heat transfer medium for transferring heat from the refrigerated compartment to the cold junction plates 21 of the thermoelectric heat pump assembly 22. The upper inside surface of the double walled lining 11 may be insulated as shown at 23, FIGURE 1, to reduce the formation of condensate on the surface and to minimize heat transfer to the refrigerator when the heat pump assembly 22 is deenergized. One or more shelves 24 may be mounted on the lining. Insulation 33 is placed between the outer case 25 and the double walled lining 11.

The hot junctions 26 of the thermoelectric heat pump assembly are placed in thermal contact with a heat dissipating double walled lining 27. The lining 27 likewise comprises spaced plates 28 and 29 which are bonded over predetermined areas 30 to form a plurality of intercommunicating passages or cavities 31. The space between the plates is partly filled with a volatile liquid which serves as the heat transfer medium for transferring heat from the hot junction plates 26 of the thermoelectric heat pump assembly to the surrounds by convection, radiation, etc.

In accordance with the present invention, the double walled lining 27 may form a warmer which is provided with a drawer 34. The space 36 between the sides, and top and bottom of the drawer and the adjacent double walled lining 27 provides channels for the circulation of air as indicated by the arrows 37. A fan or other means 38 may be provided at the rear of the double walled lining for circulating the air indicated in FIGURE 2. Circulation of the air closely adjacent to the surface of the double walled lining increases the heat transfer coefficient between the circulating air and the lining. It has been found that even without circulation of the air, the heat transfer is substantial and the refrigerator will be maintained at safe temperatures for prolonged periods.

There is illustrated at the bottom of FIGURE 1 another double walled lining 39 which forms a freezer space. The double walled lining is of the type previously described and is partly filled with a volatile liquid. It has its upper surface in thermal contact with the cold junctions of a thermocouple assembly 40. The hot junctions of the thermocouple assembly are thermally connected to the double walled lining 11 whereby heat is removed from the freezer compartment, transferred to the double walled lining 11 where it is transferred by the volatile liquid to the cold junctions of the thermocouple assembly 22, and, in turn, to the double walled heat dissipating lining 27. The double walled lining 39 may include insulation 41 to minimize heat transfer to the freezer compartment when the heat pump assembly 40 is deenergized.

The configuration of the double walled linings 27 and 39 may be such as to provide a relatively wide spacing 42 between the lining 11 and each of the linings 27 and 39. Suitable insulation is placed between the same to prevent direct transfer of heat between the double walled linings 27, 39 and 11.

Figure 4:
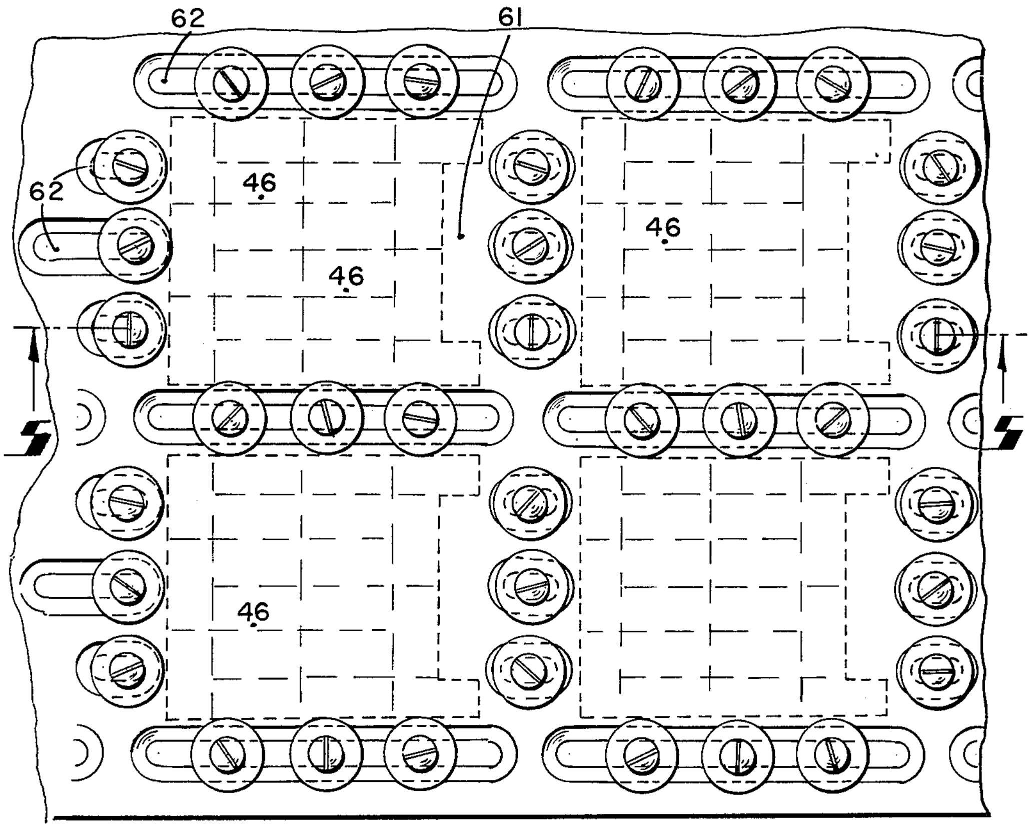
FIGURE 4 is a plan view of another thermoelectric heat pump mounting assembly.

As is well known, thermoelectric heat pump assemblies include a pattern of hot junction plates usually made from copper united to the cold junction plates by legs of thermocouples made from semiconductive material. The space between the junctions not occupied by the legs of the couples is filled with a foam insulation. The couples are electrically coupled in series with leads extending therefrom. Referring particularly to FIGURE 4, there is shown in dotted outline the hot junction plates 46 of the thermoelectric heat pump assemblies employed between the double walled lining 11 and the double walled lining 27. The bonded areas 14 of the double walled linings 11 and 30 of the double walled lining 27 should be substantially smaller than the area of each of the plates 46 whereby the raised surfaces are in contact with substantial portions of each of the junction plates. Since the junction plates are electrically energized, suitable electrical insulation is placed between the plates and the raised portions of the double walled lining. Preferably, the electrical insulation should provide good thermal heat conduciton between the junction plates and the double walled lining.

It has been found that if the double walled linings are formed of aluminum and anodized to provide a thin oxide film, there is provided suitable electrical insulation between the junction plates and the double walled linings. Yet the thickness of the oxide is such that heat transfer between the members by conduction is not appreciably reduced.

Figure 2:
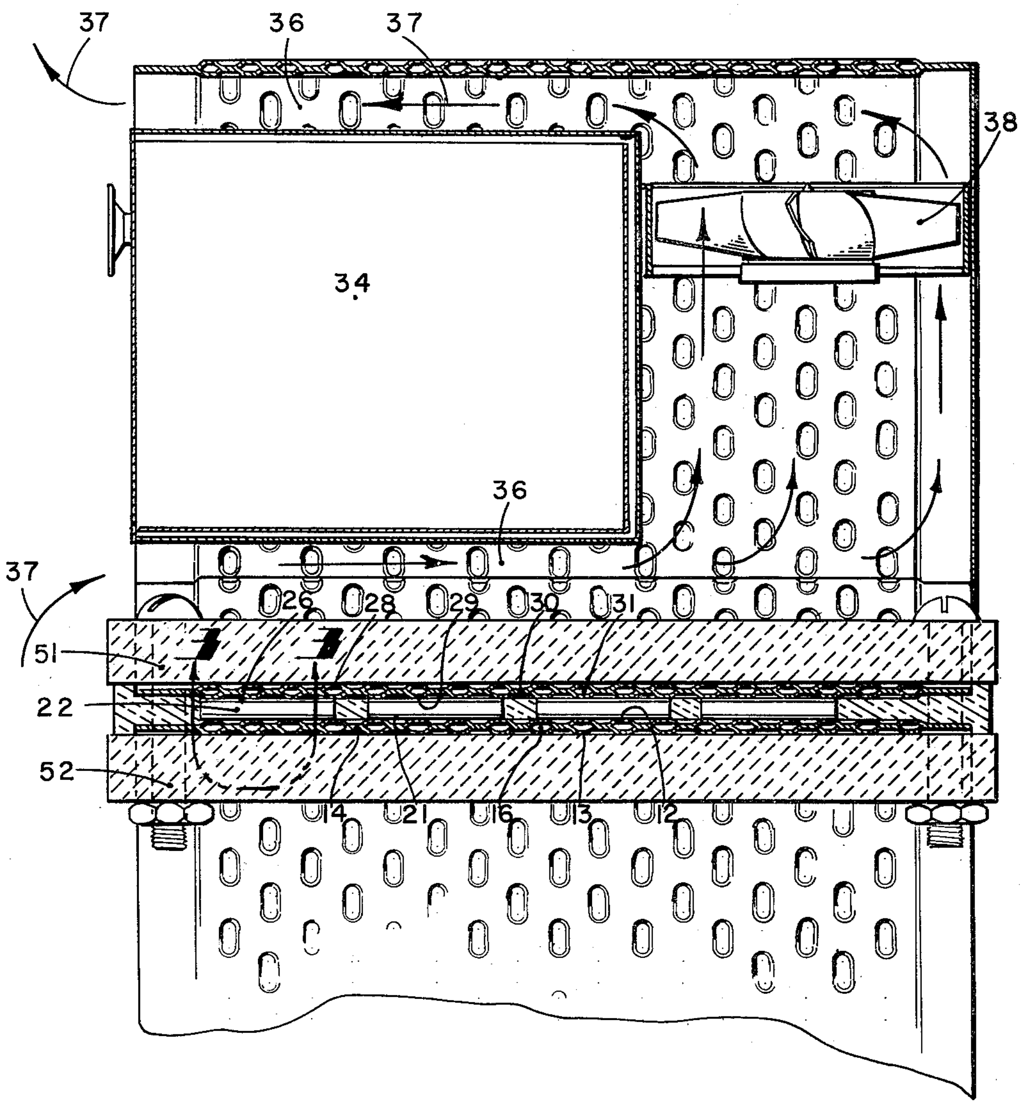
FIGURE 2 is an enlarged view taken along the line 2—2 of FIGURE 1.
Figure 3:
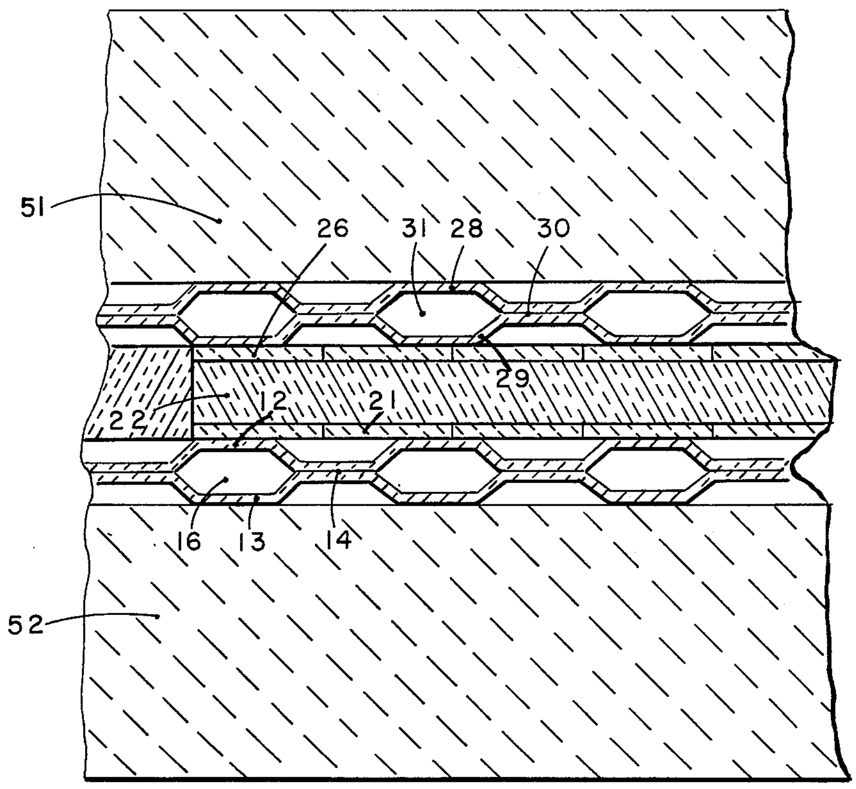
FIGURE 3 is an enlarged view taken along the line 3—3 of FIGURE 2.

To obtain good thermal contact, the raised portions should be placed in pressure contact with the junction plates. Referring to FIGURES 2 and 3, pressure contact is formed between the plates 12 and 29 and the adjacent junction plates 21 and 26, respectively, by employing a pair of rigid spaced plates 51 and 52 provided with bolts, screws or the like which are tightened to provide pressure contact between the double walled lining and the hot and cold junction plates, respectively, as described above. The bolts, screws or the like are either thermally insulated from the plates 51 and 52, or are themselves formed of insulating material to reduce the transfer of heat by conduction.

Figure 5:
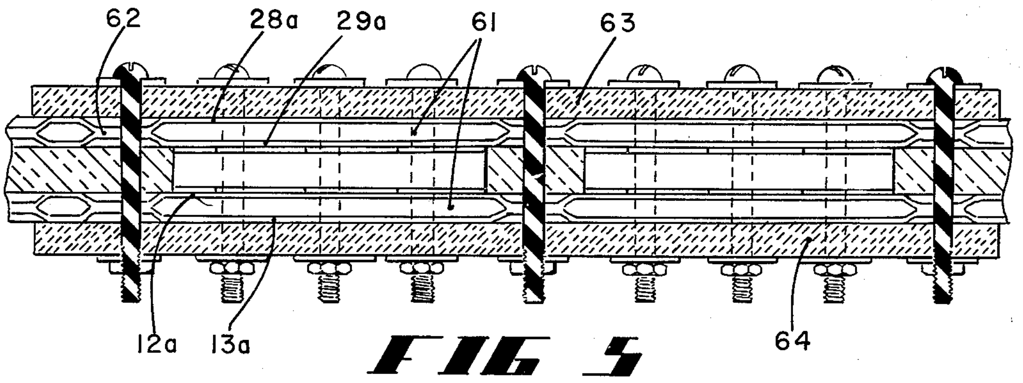
FIGURE 5 shows a sectional view taken along the line 5—5 of FIGURE 4.

To provide complete thermal contact between the various surfaces, the bonding at the top portion of the lining 11 and the bottom portion of the lining 27 may be as shown in FIGURES 4 and 5. Referring to these figures, it is seen that the spaced plates 12*a*, 13*a*, 28*a* and 29*a* have a substantial area 61 which is raised (not bonded). Bonded areas 62 are disposed around the periphery of the area 61 to receive bolts, screws, etc., 65. These raised or unbonded areas are substantially larger than areas which can withstand the internal pressure of the volatile heat transfer medium without deformation or ballooning of the unbonded areas.

It is, therefore, necessary when employing plates of this type which have large unbroken contact areas with the hot and cold junction plates, respectively, that the double walled lining be placed in intimate contact with the hot and cold plates of the associated thermocouple assembly, and screws 65 inserted through openings formed in the bonded regions 62 and secured to spaced pressure plates 63 and 64 before the volatile liquid heat transfer medium is introduced under pressure within the double walled lining to partially fill the same. Otherwise, expansion or ballooning of the large unbonded area of the double walled lining will result. The tendency to balloon is used to advantage in the assembly of FIGURES 4 and 5 since this causes good pressure contact with the associated junction plates. The pressure contact which results gives high heat transfer between the junction plates and the wall of the double walled lining. The expansion or ballooning can also be restricted by employing spaced rigid plates which are bolted together as in the embodiment shown in FIGURES 2 and 3.

It is apparent that the same type of connections can be made between the cold and hot junction plates of the freezer compartment and the double walled lining 11, and such are not illustrated in detail.

I claim:

1. A refrigerator comprising a first refrigerated space and a second refrigerated space at a higher temperature than the first space, a double walled lining of the type in which the walls are bonded over a plurality of predetermined areas to form interconnected spaces forming ceiling, floor and side walls of said second refrigerated space, a volatile liquid heat transfer medium partly filling the interconnected spaces of said double walled lining, first and second thermocouple assemblies each having hot and cold junction plates, the hot junctions of said first thermocouple assembly being electrically insulated from the double walled lining and in thermal contact therewith, the cold junctions of said first thermocouple assembly disposed in heat exchange relationship to the first refrigerated space, the cold junctions of said second thermocouple assembly being electrically insulated from the double walled lining and in thermal contact therewith, and a heat dissipating surface comprising a double walled lining of the type in which the walls are bonded over a plurality of predetermined areas to form interconnected spaces having a portion electrically insulated from and in thermal contact with the hot junction plates of the second thermocouple assembly, and means for circulating air past the heat dissipating surface.

2. A refrigerator as in claim 1 wherein said double walled lining forming the second refrigerated space and the double walled lining forming the heat dissipating surface are formed of aluminum which is anodized.

3. A refrigerator as in claim 1 wherein the double walled linings forming the second refrigerated space and the heat dissipating surface are maintained in pressure contact with the adjacent junctions of the second thermocouple assembly.

4. A refrigerator as in claim 1 wherein said heat dissipating double walled lining includes top, bottom and side walls, and a drawer disposed within said lining, said means for circulating air serving to circulate air between the walls of the lining and the drawer.

5. A refrigerator as in claim 1 wherein the bonding area of said double walled linings is substantially less than the area of individual junction plates.

6. A refrigerator comprising a first refrigerated space and a second refrigerated space at a higher temperature than the first space; a double walled lining of the type in which spaced walls are bonded over a plurality of predetermined areas to form interconnected passages, forming ceiling, floor and side walls of said second refrigerated space; a volatile liquid heat transfer medium partly filling the interconnected passages; first and second thermocouple assemblies each having hot and cold junction plates, the hot junction plates of said first thermocouple assembly being electrically insulated from the double walled lining and in thermal contact therewith, the cold junctions of said first thermocouple assembly disposed in heat exchange relationship to the first refrigerated space, the cold junction of said second thermocouple assembly being electrically insulated from the double walled lining and in thermal contact therewith over a portion thereof; and a heat dissipating surface comprising a double walled lining of the type in which spaced walls are bonded over a plurality of predetermined areas to form interconnected passages; a volatile liquid heat transfer medium partly filling the interconnected passages; said heat dissipating surface having a portion electrically insulated from and in thermal contact with the hot junction plates of the second thermocouple assembly; the portions of said double walled linings forming the second refrigerated space and the heat dissipating surface being unbonded over said thermal contact portions to provide thermal contact between the junction plates and the adjacent portions of the double walled lining over the entire area of the same, and means for applying pressure between the thermal contacting portions of the double walled linings and the junction plates.

7. A refrigerator comprising a refrigerated space defined in part by a double walled lining of the type in which the walls are bonded over a plurality of predetermined areas to form interconnected spaces, a volatile liquid heat transfer medium partly filling said interconnected spaces, a thermocouple assembly including hot and cold junction plates having its cold junction plates electrically insulated from the double walled lining and in thermal contact therewith, a heat dissipating surface comprising a double walled lining of the type in which the walls are bonded over a plurality of predetermined areas to form interconnected spaces having a portion in thermal contact with the hot junction plates of said thermocouple assembly, said heat dissipating surface including top, bottom and side walls defining a space, a drawer disposed in said space and spaced from the walls to provide air circulating passages therebetween, and means for circulating air past the heat dissipating surface through said passages.

8. A refrigerator comprising a refrigerated space defined in part by a double walled lining of the type in which the walls are bonded over a plurality of predetermined areas to form interconnected spaces, a volatile liquid heat transfer medium partly filling said interconnected spaces, a thermocouple assembly including hot and cold junction plates having its cold junction plates electrically insulated from the double walled lining and in thermal contact therewith, a heat dissipating surface comprising a double walled lining of the type in which the walls are bonded over a plurality of predetermined areas to form interconnected spaces having a portion in thermal contact with the hot junction plates of said thermocouple assembly, means for applying pressure between the double walled linings forming the refrigerated space and the heat dissipating surface and the junction plates, and means for circulating air past the heat dissipating surface.

9. A refrigerator comprising a refrigerated space defined in part by a double walled lining of the type in which the walls are bonded over a plurality of predetermined areas to form interconnected passages, a volatile liquid heat transfer medium partly filling said interconnected passages, a thermocouple assembly including hot and cold junction plates electrically insulated from the double walled lining and in thermal contact therewith a portion thereof, a heat dissipating surface comprising a double walled lining of the type in which the walls are bonded over a plurality of predetermined areas to form interconnected passages having a portion in thermal contact with the hot junction plates of said thermocouple assembly, the portion of said double walled linings in thermal contact with said hot and cold junction plates not being bonded whereby the thermal contact between the junction plates and adjacent wall is over the entire area of the junction plates, and means are provided for applying pressure between the double walled linings forming the refrigerated space, the heat dissipating surfaces and the junction plates.

References Cited by the Examiner

UNITED STATES PATENTS

| | | | |
|---|---|---|---|
| 2,085,191 | 6/37 | Hastings | 165—170 |
| 2,215,372 | 9/40 | Howeth | 62—382 |
| 2,332,349 | 10/43 | Schulz | 62—523 |
| 2,401,613 | 6/46 | Charland | 62—326 |
| 2,626,130 | 1/53 | Raskin | 62—516 |
| 2,686,957 | 8/54 | Koerper | 29—157.3 |
| 2,734,259 | 2/56 | Beck | 29—157.3 |
| 2,760,346 | 8/56 | Grenell | 62—523 |
| 2,932,953 | 4/60 | Becket | 62—3 |
| 2,947,150 | 8/60 | Roeder | 62—3 |
| 2,966,033 | 12/60 | Hughel | 62—3 |
| 2,973,627 | 3/61 | Lackey | 62—3 |
| 2,978,875 | 4/61 | Lackey | 62—3 |
| 3,018,731 | 1/62 | Bury | 62—3 |
| 3,052,100 | 9/62 | Homkes | 62—3 |
| 3,075,360 | 1/63 | Elfving | 62—3 |
| 3,100,969 | 8/63 | Elfving | 62—3 |

WILLIAM J. WYE, *Primary Examiner.*

ROBERT A. O'LEARY, *Examiner.*